(12) United States Patent
Layne et al.

(10) Patent No.: US 10,757,539 B1
(45) Date of Patent: *Aug. 25, 2020

(54) SYSTEM FOR MAPPING BUILDING INTERIOR WITH PDR AND RANGING AND RELATED METHODS

(71) Applicant: EAGLE TECHNOLOGY, LLC, Melbourne, FL (US)

(72) Inventors: Dennis R. Layne, Forest, VA (US); Brian R. Carlson, Goode, VA (US); Alan D. Thiessen, Forest, VA (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/800,515

(22) Filed: Feb. 25, 2020

Related U.S. Application Data

(63) Continuation of application No. 16/512,494, filed on Jul. 16, 2019, now Pat. No. 10,616,723.

(51) Int. Cl.
*H04W 24/00* (2009.01)
*H04W 4/029* (2018.01)
(Continued)

(52) U.S. Cl.
CPC ............ *H04W 4/029* (2018.02); *G01C 21/16* (2013.01); *G01C 21/206* (2013.01); *G01S 17/89* (2013.01);
(Continued)

(58) Field of Classification Search
CPC ....... H04W 24/00; H04W 4/33; H04W 4/026; H04W 4/027; H04W 4/029; H04W 16/20; G01S 17/89; G01S 5/0252; G01S 5/0018; G01C 21/206; G01C 21/16; G01C 21/20; G06T 7/00; H04N 5/225; H04B 17/318; H04B 17/391; H04B 17/27
(Continued)

(56) References Cited

U.S. PATENT DOCUMENTS 8,284,100 B2 * 10/2012 Vartanian ................ G01S 15/08
342/357.3
8,706,414 B2 4/2014 Funk et al.
(Continued)

FOREIGN PATENT DOCUMENTS

DE 102009059813 6/2011

OTHER PUBLICATIONS

Selinger, Peter "Potrace: Transforming bitmaps into vector graphics" potrace.sourceforge.net; May 21, 2019; pp. 8 See Priority U.S. Appl. No. 16/512,494, filed Jul. 16, 2019.

*Primary Examiner* — Mahendra R Patel
(74) *Attorney, Agent, or Firm* — Allen, Dyer, Doppelt + Gilchrist, P.A. Attorneys at Law

(57) ABSTRACT

A system is for mapping an interior of a building. The system may include a mobile device having a PDR circuit configured to generate PDR positions as a user moves within the interior of the building, and a ranging circuit configured to generate ranging mapping data of the interior of the building as the user moves within the interior of the building. The system also may include a server configured to map the interior of the building and generate a location of the mobile device within the interior of the building based upon the PDR positions and the ranging mapping data from the mobile device.

23 Claims, 6 Drawing Sheets

(51) Int. Cl.

| | | |
|---|---|---|
| *H04W 4/02* | (2018.01) | |
| *G01C 21/20* | (2006.01) | |
| *G01C 21/16* | (2006.01) | |
| *H04W 4/33* | (2018.01) | |
| *G01S 17/89* | (2020.01) | |

(52) U.S. Cl.
CPC ........... *H04W 4/026* (2013.01); *H04W 4/027* (2013.01); *H04W 4/33* (2018.02)

(58) Field of Classification Search
USPC ............... 455/456.1, 456.2, 456.3, 446; 1/1; 701/428, 472
See application file for complete search history.

(56) References Cited

U.S. PATENT DOCUMENTS

| | | |
|---|---|---|
| 9,807,725 B1 | 10/2017 | Vitus et al. |
| 9,952,680 B2 | 4/2018 | Ricci |
| 10,027,952 B2 | 7/2018 | Karvounis |
| 10,352,718 B2 * | 7/2019 | Wu ................... G01C 21/32 |
| 10,514,271 B2 * | 12/2019 | O'Beirne .............. G06F 3/0481 |
| 2005/0182518 A1 | 8/2005 | Karlsson |
| 2007/0118248 A1 * | 5/2007 | Lee ...................... G05D 1/0225 |
| | | 700/245 |
| 2009/0043504 A1 * | 2/2009 | Bandyopadhyay ..... H04W 4/33 |
| | | 701/469 |
| 2012/0143495 A1 * | 6/2012 | Dantu .................. G01C 21/206 |
| | | 701/428 |
| 2015/0198447 A1 * | 7/2015 | Chen .................... G01S 5/0252 |
| | | 701/472 |
| 2016/0371394 A1 * | 12/2016 | Shahidi ................ G01S 5/0252 |
| 2017/0082725 A1 | 3/2017 | Haverinen et al. |
| 2017/0146349 A1 * | 5/2017 | Yang ................... G01C 21/005 |
| 2017/0176191 A1 * | 6/2017 | Li ........................... G01S 19/01 |
| 2018/0091939 A1 * | 3/2018 | Venkatraman ........ G01S 5/0242 |
| 2018/0112983 A1 | 4/2018 | Ahmed et al. |
| 2018/0245927 A1 * | 8/2018 | Frish .................... H04W 4/025 |

\* cited by examiner

SYSTEM FOR MAPPING BUILDING INTERIOR WITH PDR AND RANGING AND RELATED METHODS

TECHNICAL FIELD

The present disclosure relates to the field of location determination, and, more particularly, to mobile device location determination and mapping, and related methods.

BACKGROUND

A position of a person or object may be determined using a global positioning system (GPS) receiver, for example. However, to use a GPS receiver, a GPS antenna coupled to the GPS receiver needs a line of sight to GPS satellites. For increased accuracy, the number of GPS satellites having a line of sight to the GPS antenna increases. In other words, position determining using a GPS receiver may not work indoors, for example, or other location where the GPS antenna does not have a line of sight to the sky.

In such GPS denied locations, a person or object may be tracked using an inertial measurement unit (IMU). An inertial measurement unit may cooperate with an accelerometer to calculate displacement, for example. More particularly, a determined acceleration may be first integrated over a time period to determine a velocity. The velocity may be integrated over the time period to determine the displacement. In other words, a double integration is performed on the acceleration to arrive at the displacement.

Velocity drift due to accumulation of errors or noise may contribute to inaccuracies in determining the displacement over the time period. Additionally, gyroscope drift and bias in systems that include a gyroscope, for direction, for example, may also contribute to displacement inaccuracies over the time period. Moreover, performing the double integration of the determined acceleration over the time period, especially if the time period is relatively long or includes a relatively large amount of data samples from the accelerometer, typically introduces a relatively large error over the time period.

When the IMU is measured via a mobile device carried by a user, the process for location determining is known as pedestrian dead reckoning (PDR). In essence, the mobile device connects the dots from the last known position to attempt to determine the current location.

SUMMARY

Generally, a system is for mapping an interior of a building. The system may include at least one mobile device comprising a PDR circuit configured to generate a plurality of PDR positions as a user moves within the interior of the building, and a ranging circuit configured to generate ranging mapping data of the interior of the building as the user moves within the interior of the building. The system also may include a server configured to map the interior of the building and generate a location of the at least one mobile device within the interior of the building based upon the plurality of PDR positions and the ranging mapping data from the at least one mobile device.

In some embodiments, the ranging circuit may comprise a Light Detection and Ranging (LiDAR) circuit. The system may include a wireless base station coupled to the server, and the at least one mobile device may comprise a wireless transceiver communicating with the wireless base station to send the plurality of PDR positions and the ranging mapping data. For example, the wireless transceiver may comprise at least one of an ultra high frequency (UHF) transceiver and a very high frequency (VHF) transceiver.

In particular, the server may be configured to correct an accumulated PDR error in the plurality of PDR positions based upon the ranging mapping data. The at least one mobile device may comprise a geolocation device configured to generate an initial geolocation value, and the server may be configured to generate the location of the at least one mobile device further based upon the initial geolocation value.

Also, the ranging mapping data may comprise a ranging point cloud, and the at least one mobile device may be configured to convert the ranging point cloud into vector graphics data before sending to the server. The at least one mobile device may comprise a plurality thereof. The server may be configured to receive the ranging mapping data from each mobile device, and to generate the location of a given mobile device based upon the ranging mapping data from the plurality of mobile devices.

Additionally, the PDR circuit may be configured to generate each PDR position to comprise an x-position value, a y-position value, and a z-position value. The PDR circuit may comprise at least one of an accelerometer, a gyroscope, a magnetometer, and an altimeter.

Another aspect is directed to a method for operating a system for mapping an interior of a building. The method may include operating a PDR circuit in at least one mobile device to generate a plurality of PDR positions as a user moves within the interior of the building, and operating a ranging circuit in the at least one mobile device to generate ranging mapping data of the interior of the building as the user moves within the interior of the building. The method may further include operating a server in communication with the at least one mobile device to map the interior of the building and generate a location of the at least one mobile device within the interior of the building based upon the plurality of PDR positions and the ranging mapping data from the at least one mobile device.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

In public safety applications, for example, the available approaches for determining a location for the mobile device may not be viable for when the user and associated mobile device enter a building. There have been some approaches that try to address internal building location determination by using various radio frequency (RF) signals, such as ultra-wideband from outside the building, triangulation of beacons, and WiFi signal strength, etc. These approaches attempt to figure out location coordinates from time of flight of the RF signals or signal strength and triangulation. The potential problem with these approaches is that they are sensitive to signals that are attenuated by walls. The presence of walls is not known ahead of time and walls can block RF signals or greatly attenuate them.

Even if these technologies could provide location coordinates (e.g. GPS coordinates) of individual users, this simply determines the user's location (i.e. longitude and latitude) on the earth. Indeed, it is possible to know someone's GPS coordinates and still not know how to get to them. In fact, inside a multi-story building, the GPS location does not include information on the route to reach the person.

Figure 1:
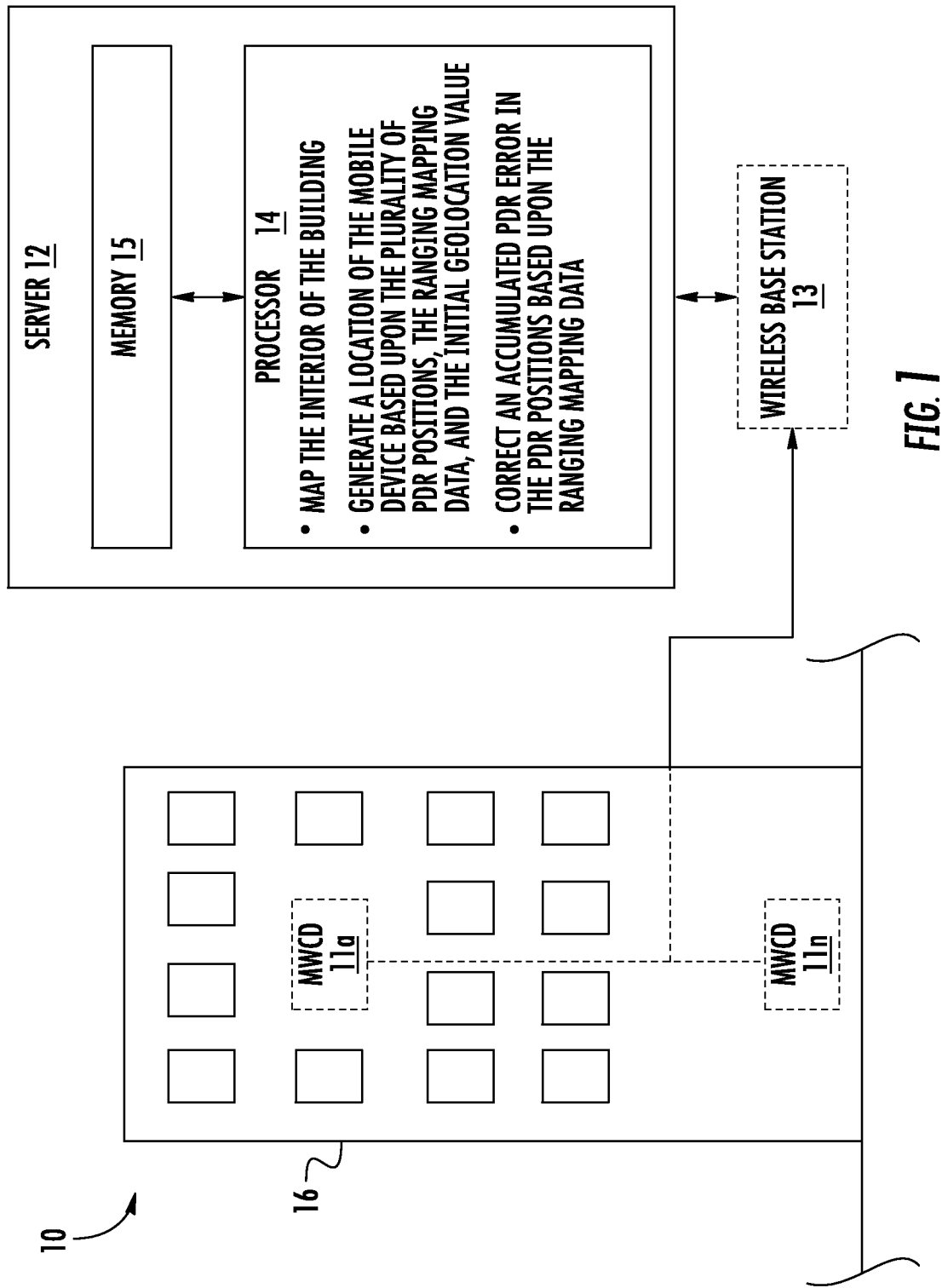
FIG. 1 is a schematic diagram of a system, according to the present disclosure.
Figure 2:
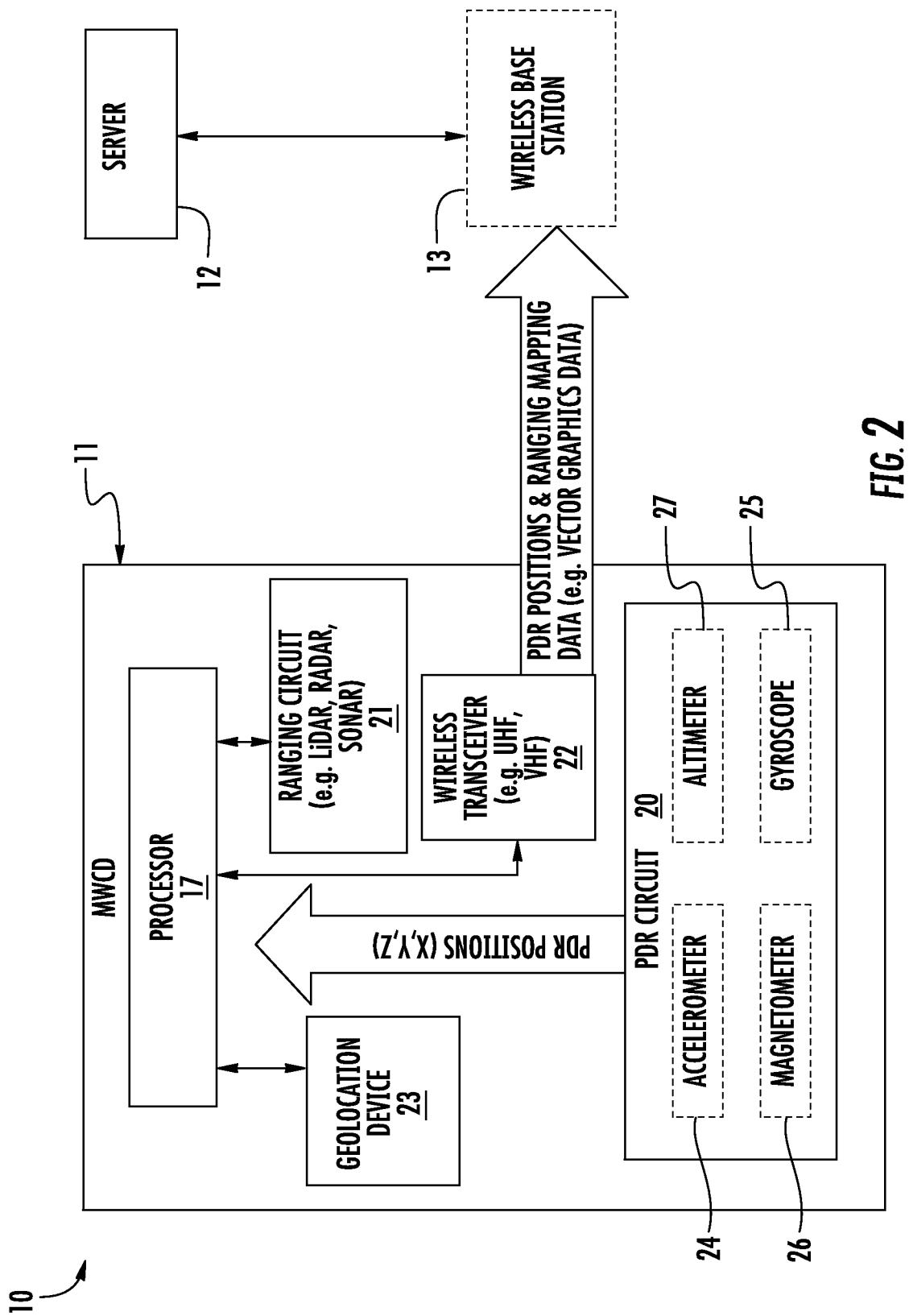
FIG. 2 is another schematic diagram of the system of FIG. 1.

Referring initially to FIGS. 1-2, a system 10 illustratively is for mapping an interior of a building 16. The system 10 illustratively includes a plurality of mobile devices 11a-11n, a wireless base station 13 in communication with the plurality of mobile devices, and a server 12 in communication with the wireless base station. The system 10 is also for determining locations of the plurality of mobile devices 11a-11n and respective users within the building 16.

For example, the wireless base station 13 may comprise a MASTR V Base Station, as available from the Harris Corporation of Melbourne, Fla., the present application's Applicant. Also, each of the plurality of mobile devices 11a-11n may comprise a XL-185P handheld radio, as available from the Harris Corporation of Melbourne, Fla., the present application's Applicant.

The server 12 illustratively comprises a processor 14, and a memory 15 coupled thereto. For example, the server 12 may comprise a standalone computing device and/or assigned resources from a cloud computing platform. As will be appreciated, in some applications, the wireless base station 13 may be geographically adjacent to the building 16, and the server 12 may be geographically remote to the building and the wireless base station and be connected by, for example, a network connection, such as the Internet.

Each of the plurality of mobile devices 11a-11n illustratively comprises a processor 17, and a PDR circuit 20 coupled to the processor and configured to generate a plurality of PDR positions as a user moves within the interior of the building 16. The PDR circuit 20 is configured to generate each PDR position to comprise an x-position value, a y-position value, and a z-position value. The PDR circuit 20 may comprise one or more of an accelerometer 24, a gyroscope 25, a magnetometer 26, and an altimeter 27. The accelerometer 24, the gyroscope 25, the magnetometer 26, and the altimeter 27 are all shown with dashed lines, and it should be appreciated that the PDR circuit 20 may include any combination of these items.

Each of the plurality of mobile devices 11a-11n illustratively includes a ranging circuit 21 coupled to the processor 17 and configured to generate ranging mapping data of the interior of the building as the user moves within the interior of the building. More specifically, the ranging mapping data comprises a ranging point cloud.

In some embodiments, the ranging circuit 21 comprises a LiDAR ranging circuit configured to generate LiDAR mapping data, i.e. a LiDAR point cloud. In other embodiments, the ranging circuit 21 may comprise alternatively or additionally a RADAR circuit or a SONAR circuit.

Also, the ranging circuit 21 is configured to periodically sweep adjacent portions of the interior of the building 16, for example, 1 Hz. Also, for example, the ranging circuit 21 may provide a radial sweep of distance values spaced apart by 2 or more degrees.

In some embodiments, the ranging circuit 21 is configured to conduct sweeps substantially simultaneously (i.e. ±100 ms) with generation of a new PDR position. The ranging mapping data relates to shapes and respective positions of features of the interior of the building 16. For example, the features may include walls, openings in walls, and non-structural barriers, etc.

Each of the plurality of mobile devices 11a-11n illustratively includes a wireless transceiver 22 coupled to the processor 17 and communicating with the wireless base station 13 to send the plurality of PDR positions, the ranging mapping data, and other data. For example, the wireless transceiver 22 may comprise one or more of an ultra high frequency (UHF) transceiver (i.e. operating at the 300 MHz-3 GHz range), or a very high frequency (VHF) transceiver (i.e. operating at the 30-300 MHz range) (e.g. Project 25 transceiver). Of course, these frequency bands are exemplary in nature and other frequency bands could be added or used alternatively. Advantageously, the UHF and/or VHF transceivers may have the capability to penetrate the structural features of the building 16.

Each of the plurality of mobile devices 11a-11n illustratively includes a geolocation device 23 coupled to the processor 17 and configured to generate an initial geolocation value (e.g. GPS coordinates). For example, the geolocation device 23 may comprise a satellite based location determining system, such as the GPS.

As will be appreciated, when users of the plurality of mobile devices 11a-11n enter the building 16, the line of sight with the sky is impaired, and the geolocation device 23 may be inoperable (i.e. the GPS denied scenario). Indeed, the initial geolocation value may comprise the last accurate position value generated before entry into the building 16, providing an accurate building entry point for the user.

Because of this, the location of users of the plurality of mobile devices 11a-11n in the building 16 is difficult to ascertain. This can be particularly problematic in public safety applications, when there are a large number of personnel in the building 16.

In the illustrated embodiment, the wireless base station 13 is configured to route the plurality of PDR positions, the ranging mapping data, and the initial geolocation value from the plurality of mobile devices 11a-11n to the server 12 via the wireless transceiver 22. The wireless base station 13 is shown in dashed lines, and could be omitted in other embodiments where the plurality of mobile devices 11a-11n would communicate directly with the server 12. In these embodiments, the server 12 would also include a wireless transceiver, or operate, at least in part, over a wireless link.

Once the server 12 has received the plurality of PDR positions, the ranging mapping data, and the initial geolocation value, the server 12 is configured to map the interior of the building 16 and generate respective locations of the plurality of mobile devices 11a-11n within the interior of the building based upon at least the plurality of PDR positions and the ranging mapping data, and in some embodiments, additionally further based upon the initial geolocation value.

Figure 3:
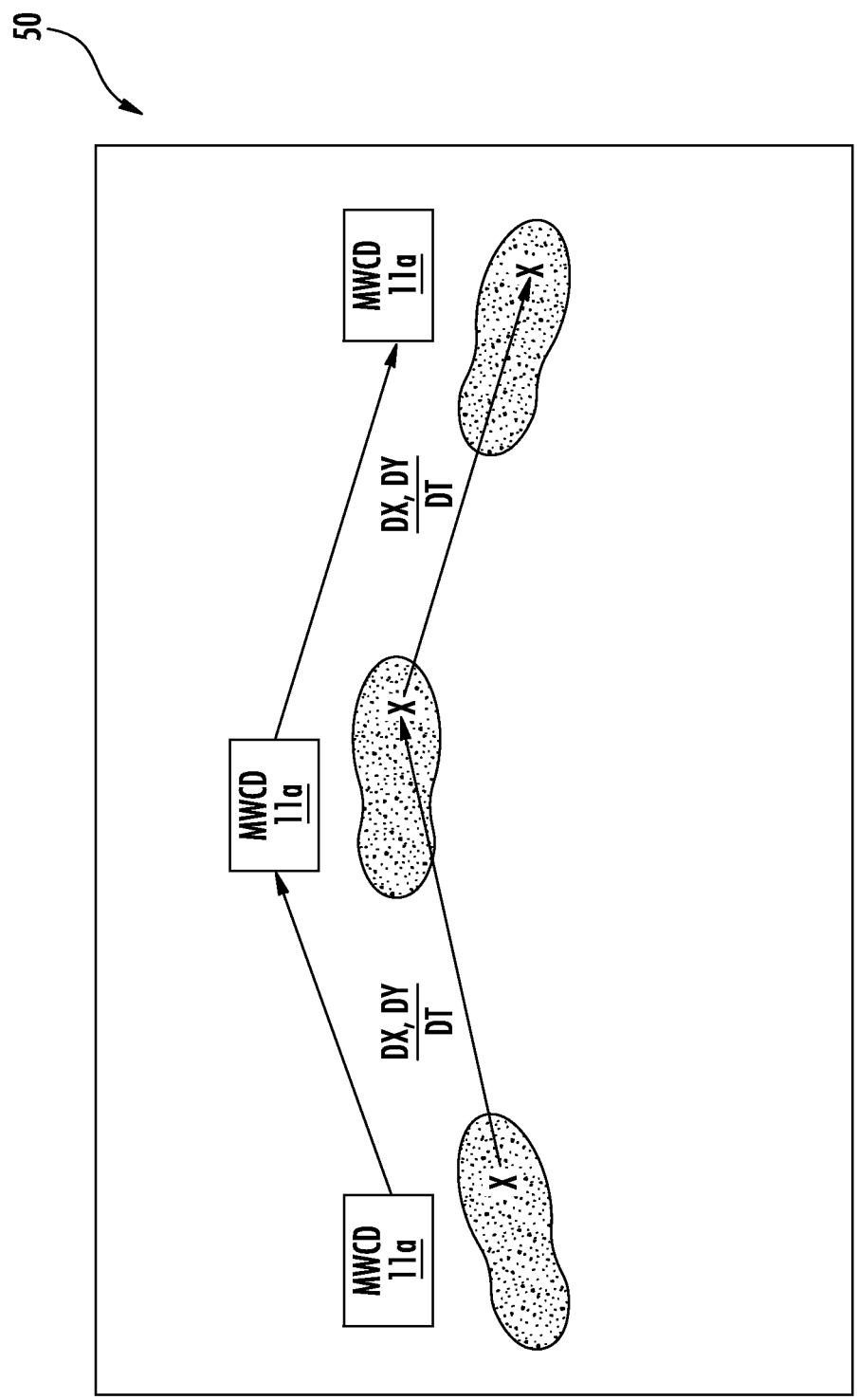
FIG. 3 is a schematic diagram of movement of the mobile device and PDR calculations in an example embodiment of the system of FIG. 1.
Figure 4:
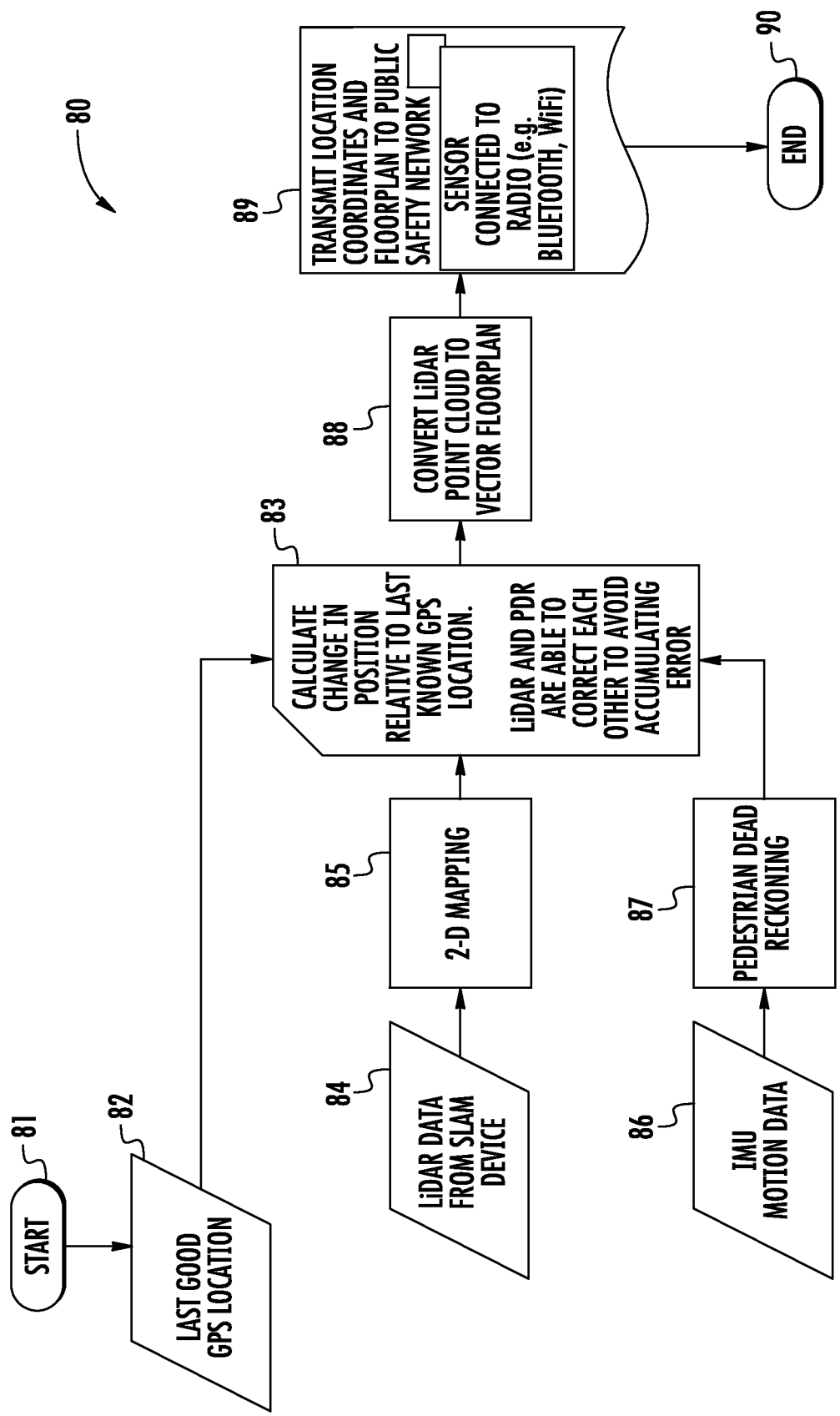
FIG. 4 is a flowchart showing a method of operating a first example embodiment of the system of FIG. 1.

Referring now additionally to FIGS. 3-4, the diagram 50 therein, and the flowchart 80 therein, the method for the server 12 to map the interior of the building 16 and generate respective locations of the plurality of mobile devices 11a-11n is now described. (Block 81). For a given mobile device 11a, the server 12 is configured to generate plurality of PDR positions based upon measured relativistic inertial movement ((dX, dY)/dT) from the initial geolocation value (i.e. the last known accurate geolocation data). (Blocks 82-83, 86-87). Nevertheless, the accuracy of the plurality of PDR positions decreases linearly with the length of the sequence (i.e. an accumulated PDR error). Eventually, the calculated current location based solely upon the plurality of PDR positions will become inaccurate. Helpfully, the server 12 is configured to correct the accumulated PDR error in the plurality of PDR positions based upon the ranging mapping data (e.g. illustrated LiDAR mapping data). (Blocks 84-85). In particular, the LiDAR mapping data provides an accurate bearing and distance to known features of the interior of the building 16.

Figure 5:
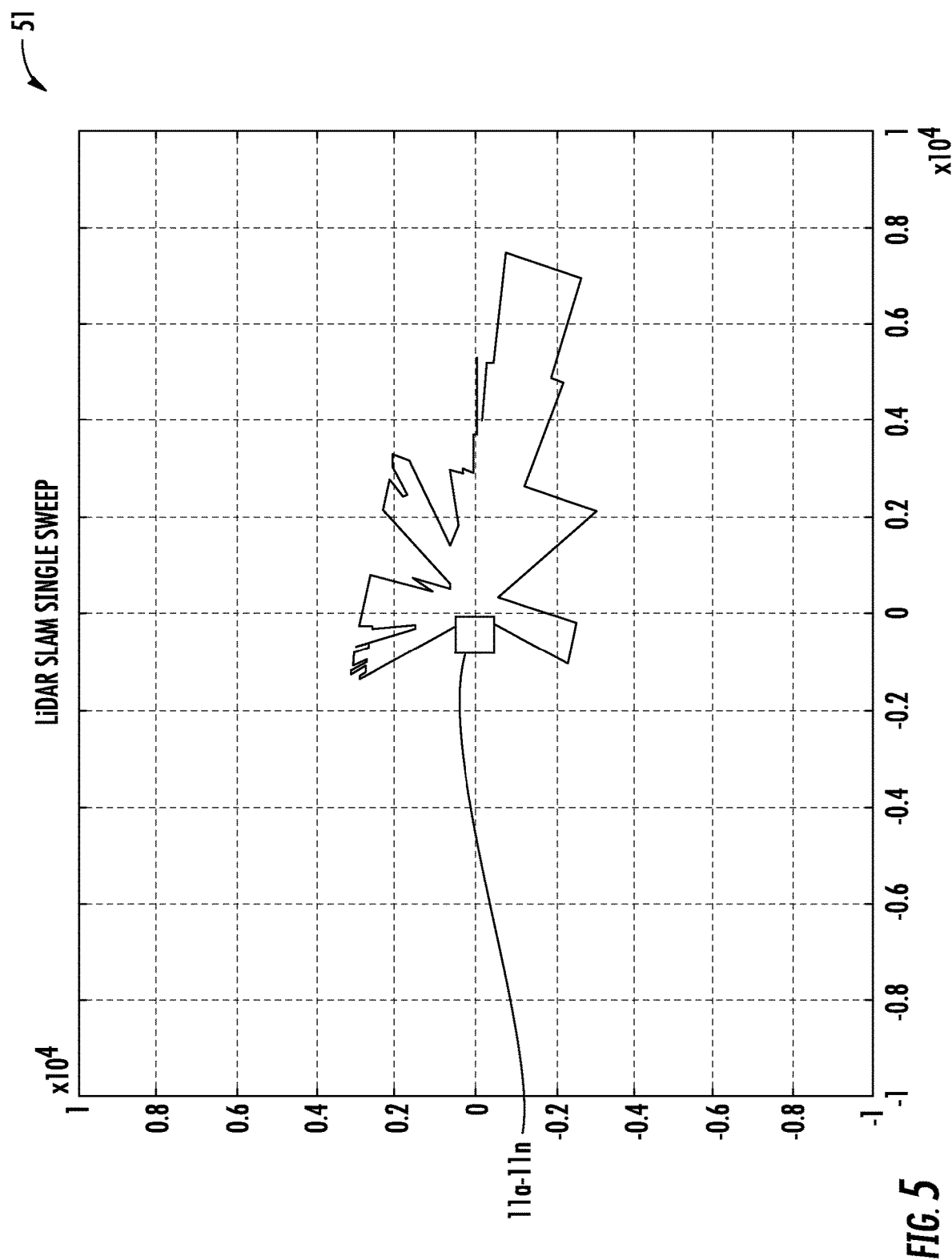
FIG. 5 is a diagram of ranging mapping data in an example embodiment of the system of FIG. 1.

Referring now additionally to FIG. 5 and the diagram 51 therein, an example of the LiDAR mapping data is shown. The LiDAR mapping data includes a LiDAR point cloud rendered in two-dimensional form. As can be seen, the walls of the interior of the building 16 are detected from the mobile device 11a-11n. In fact, the accuracy of the interior features is improved as additional ones of the plurality of mobile devices 11a-11n provide respective LiDAR mapping data of the same areas (i.e. effectively removing uncertainty in situational awareness for the building 16). In other words, the server 12 is configured to accumulate the LiDAR mapping data from the plurality of mobile devices 11a-11n to enhance the mapping data of the interior of the building 16.

Moreover, the server 12 is configured to store the path of travel for the users of the plurality of mobile devices 11a-11n. In other words, in some embodiments, the server 12 is accumulating ranging data from the plurality of mobile devices 11a-11n. Similarly, the server 12 is configured to leverage this additional data to further sharpen the mapping of the interior of the building 16. In fact, the server 12 is configured to generate a floorplan of the interior of the building 16. Further, since the PDR circuit 20 is configured to generate the plurality of PDR positions with a z value, the server 12 is configured to generate multi-floor floor layouts. Of course, the server 12 is also configured to provide floor specific locations of the plurality of mobile devices 11a-11n.

In some embodiments, the server 12 is configured to map the interior of the building 16 using a single mobile device 11a-11n. Of course, since the server 12 does not have the benefit of accumulating the ranging mapping data from multiple mobile devices, the server is configured to correlate the ranging mapping data with a priori known details of the building (e.g. building blueprint, floor layout).

In some embodiments, the ranging mapping data and associated ranging point cloud are onerous in data size. In embodiments where the plurality of mobile devices 11a-11n are operating on a narrowband UHF and/or VHF system, which includes bandwidth limitations, the task of transmitting the ranging mapping data to the wireless base station 13 may be impractical. Advantageously, the plurality of mobile devices 11a-11n may be configured to convert the ranging point cloud into vector graphics data before sending to the server 12. (Blocks 88-90). Since the vector graphics data has a reduced data size, this may be more readily transmitted over bandwidth limited communication protocols. For example, the conversion process may be based upon the "Potrace Tool", as available from Peter Selinger on the SourceForge web-based service, but of course, other compression methods can be used. Of course, in some embodiments where high bandwidth wireless interfaces (e.g. WiFi, cellular) are available, the complete ranging point cloud is sent to the server 12.

In the illustrated embodiment, the PDR circuit 20 and LiDAR circuit 21 are collocated in the same mobile device 11a-11n (i.e. an integrated device). In other embodiments, the given mobile device 11a-11n may comprise separate first and second communications devices. For example, the first device may comprise a bodycam or headcam format device carrying the ranging circuit 21, and the second communications device comprises a typical handheld radio device for communication with the wireless base station 13. In these embodiments, the first and second communications devices may be coupled via a wired connection, or a local wireless connection, such as Bluetooth wireless communications, or IEEE 802.11 WiFi, for example.

Figure 6:
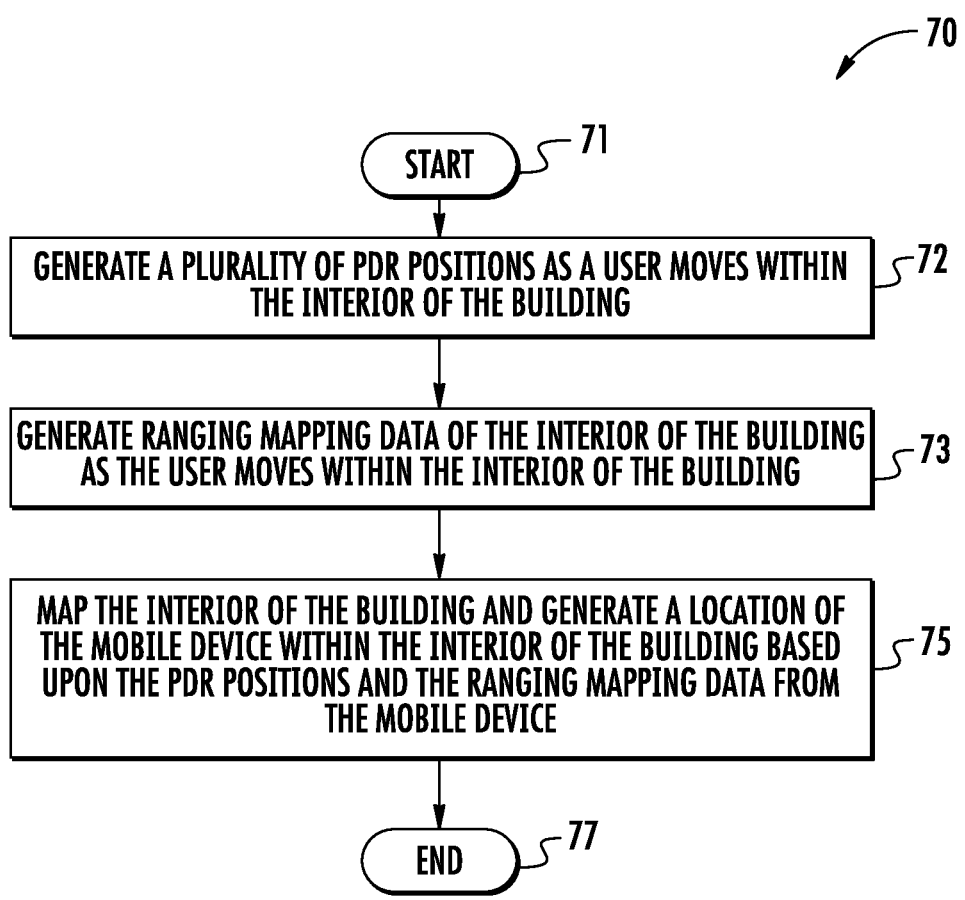
FIG. 6 is a flowchart showing a method of operating a second example embodiment of the system of FIG. 1.

Referring now to FIG. 6, a flowchart 70 describes a method for operating a system 10 for mapping an interior of a building 16. (Block 71). The method includes operating a PDR circuit 20 in at least one mobile device 11a-11n to generate a plurality of PDR positions as a user moves within the interior of the building 16 (Block 72), and operating a ranging circuit 21 in the at least one mobile device to generate ranging mapping data of the interior of the building as the user moves within the interior of the building. (Block 73). The method further includes operating a server 12 in communication with the at least one mobile device 11a-11n to map the interior of the building 16 and generate a location of the at least one mobile device within the interior of the building based upon the plurality of PDR positions and the ranging mapping data from the at least one mobile device. (Blocks 75, 77).

Advantageously, the system 10 disclosed herein uses a fusion of technologies that, when combined with public safety radio systems, will allow system operators to know where users are located inside a building and exactly how to get to them. The combination of ranging based Simultaneous localization and mapping (SLAM) and PDR will determine the precise location of the user in location coordinates as well as generate a floor plan of the building as the user moves from room to room. The data from the sensors can be converted into location coordinates and a vector graphic floorplan. This compressed data can be transported over a narrowband radio channel for the desired in-building penetration of communication.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A system for mapping an interior of a building, the system comprising:
   at least one mobile device comprising
      a pedestrian dead reckoning (PDR) circuit configured to generate a plurality of PDR positions as a user moves within the interior of the building, and
      a ranging circuit configured to generate ranging mapping data of the interior of the building as the user moves within the interior of the building and convert the ranging mapping data to graphics data; and a server configured to map the interior of the building and generate a location of said at least one mobile device within the interior of the building based upon the plurality of PDR positions and the graphics data from said at least one mobile device.

2. The system of claim 1 wherein said ranging circuit comprises a Light Detection and Ranging (LiDAR) circuit.

3. The system of claim 1 comprising a wireless base station coupled to said server; and wherein said at least one mobile device comprises a wireless transceiver communicating with said wireless base station to send the plurality of PDR positions and the graphics data.

4. The system of claim 3 wherein said wireless transceiver comprises at least one of an ultra high frequency (UHF) transceiver and a very high frequency (VHF) transceiver.

5. The system of claim 1 wherein said at least one mobile device comprises a geolocation device configured to generate an initial geolocation value; and wherein said server is configured to generate the location of said at least one mobile device further based upon the initial geolocation value.

6. The system of claim 1 wherein the ranging mapping data comprises a ranging point cloud.

7. The system of claim 1 wherein said at least one mobile device comprises a plurality thereof; and wherein said server is configured to receive the graphics data from each mobile device, and to generate the location of a given mobile device based upon the graphics data from the plurality of mobile devices.

8. The system of claim 1 wherein said PDR circuit is configured to generate each PDR position to comprise an x-position value, a y-position value, and a z-position value.

9. The system of claim 1 wherein said PDR circuit comprises at least one of an accelerometer, a gyroscope, a magnetometer, and an altimeter.

10. A method for operating a system for mapping an interior of a building, the method comprising:
   operating a pedestrian dead reckoning (PDR) circuit in at least one mobile device to generate a plurality of PDR positions as a user moves within the interior of the building;
   operating a ranging circuit in the at least one mobile device to generate ranging mapping data of the interior of the building as the user moves within the interior of the building and convert the ranging mapping data to graphics data; and
   operating a server in communication with the at least one mobile device to map the interior of the building and generate a location of the at least one mobile device within the interior of the building based upon the plurality of PDR positions and the graphics data from the at least one mobile device.

11. The method of claim 10 wherein the ranging circuit comprises a Light Detection and Ranging (LiDAR) circuit.

12. The method of claim 10 further comprising operating a wireless transceiver in the at least one mobile device to communicate with a wireless base station to send the plurality of PDR positions and the graphics data.

13. The method of claim 12 wherein the wireless transceiver comprises at least one of an ultra high frequency (UHF) transceiver and a very high frequency (VHF) transceiver.

14. The method of claim 10 further comprising operating a geolocation device in the at least one mobile device to generate an initial geolocation value, and operating the server to generate the location of the at least one mobile device further based upon the initial geolocation value.

15. The method of claim 10 wherein the ranging mapping data comprises a ranging point cloud.

16. A server for mapping an interior of a building in cooperation with at least one mobile device comprising a pedestrian dead reckoning (PDR) circuit configured to generate a plurality of PDR positions as a user moves within the interior of the building, and a ranging circuit configured to generate ranging mapping data of the interior of the building as the user moves within the interior of the building and convert the ranging mapping data to graphics data, the server comprising:
   a processor and an associated memory configured to
      obtain the plurality of PDR positions and the graphics data from the at least one mobile device, and
      map the interior of the building and generate a location of the at least one mobile device within the interior of the building based upon the plurality of PDR positions and the graphics data from the at least one mobile device.

17. The server of claim 16 wherein the ranging mapping data comprises a Light Detection and Ranging (LiDAR) data.

18. The server of claim 16 wherein the processor is configured to wirelessly obtain the plurality of PDR positions and the graphics data from the at least one mobile device.

19. The server of claim 16 wherein the processor is configured to generate the location of the at least one mobile device further based upon an initial geolocation value therefrom.

20. The server of claim 16 wherein the ranging mapping data comprises a ranging point cloud.

21. The system of claim 1 wherein the graphics data comprises vector graphics data.

22. The method of claim 10 wherein the graphics data comprises vector graphics data.

23. The server of claim 16 wherein the graphics data comprises vector graphics data.

* * * * *